United States Patent [19]

Kishita et al.

[11] Patent Number: 4,985,526
[45] Date of Patent: Jan. 15, 1991

[54] CURABLE SILICONE COMPOSITION

[75] Inventors: Hirofumi Kishita, Annaka; Kouichi Yamaguchi, Takasaki; Toshio Takago, Annaka, all of Japan

[73] Assignee: Shin-Etsu Chemical Co., Ltd., Tokyo, Japan

[21] Appl. No.: 518,220

[22] Filed: May 3, 1990

Related U.S. Application Data

[63] Continuation-in-part of Ser. No. 243,628, Sep. 13, 1988, abandoned.

[30] Foreign Application Priority Data

Sep. 14, 1987 [JP] Japan ............................ 62-230750

[51] Int. Cl.$^5$ ............................................. C08G 77/06
[52] U.S. Cl. ..................................... 528/15; 525/478; 528/31; 528/32; 528/42
[58] Field of Search ............... 528/32, 42, 15, 31, 528/32; 525/428

[56] References Cited

U.S. PATENT DOCUMENTS 3,012,006  12/1961  Holbrook et al. .................. 260/46.5
4,549,004  10/1985  von Au et al. ......................... 528/42
4,585,848  4/1986  Evans et al. ............................ 528/32

FOREIGN PATENT DOCUMENTS 2096631  10/1982  United Kingdom .

Primary Examiner—Melvyn I. Marquis
Attorney, Agent, or Firm—Oblon, Spivak, McClelland, Maier & Neustadt

[57] ABSTRACT

A curable silicone composition comprising;
(a) an organopolysiloxane having at least two silicon-bonded $C_2$ to $C_8$ alkenyl groups and containing a particular silicon-bonded fluorine-containing substituent;
(b) an organohydrogenpolysiloxane having at least three silicon-bonded hydrogen atoms and a particular silicon-bonded fluorine-containing substituent; and
(c) a catalyst; the proportion of said silicon-bonded hydrogen atoms in Component (b) to said silicon-bonded alkenyl groups in Component (a) being at least 0.5. This composition can form a film, on various substrates, having good release properties, water repellency and oil repellency.

7 Claims, No Drawings

CURABLE SILICONE COMPOSITION

This application is a continuation-in-part application of U.S. patent application Ser. No. 07/243,628 filed on Sept. 13, 1988 and now abandoned.

BACKGROUND OF THE INVENTION

1. Field of the Invention

This invention relates to a curable silicone composition, and more particularly it is concerned with a curable silicone composition that comprises an organopolysiloxane having a fluorine-containing substituent and is useful for forming a film having a small surface energy.

2. Description of the Prior Art

Uses of curable silicones include, for example, release agents used in relation to pressure sensitive adhesives. The pressure sensitive adhesives are used in the form of, for example, rolled pressure-sensitive tapes and pressure-sensitive labels. Since the pressure-sensitive tapes must be unrolled when used, a coating with release properties is previously applied on the back surface of the tape so that they can be smoothly unrolled and also the pressure-sensitive adhesive may always remain on one surface of the tape. As for the pressure-sensitive label, a coating with release properties is applied on the surface of its support so that it can be smoothly peeled from the support when used and also no pressure-sensitive adhesive may remain on the support. Such a coating with release properties is required to have a sufficient cohesion by which the coating is strongly adhered to the back surface of the tape or to the support and may not migrate to the pressure-sensitive adhesive. Known as curable silicones excellent in such release properties are those mainly composed of an organopolysiloxane containing a fluorine-containing substituent represented by the formula: $C_nF_{2n+1}CH_2CH_2$—where n is an integer of 1 or more (Japanese Unexamined patent Publication (KOKAI) Nos. 225,581/1987 and 320/1988).

In recent years, pressure-sensitive adhesives mainly composed of dimethylpolysiloxane are used in wide purpose because of their thermal resistance, cold resistance, chemical resistance and electrical insulating properties. Because of their non-toxicity, they are also used in the field of medical use. The pressure sensitive adhesives of this type, however, have so strong adhesion that the release agents comprising the conventional curable silicones may have insufficient in the release properties to be imparted. In particular, preservation for a long term of the tape or label that employ the pressure sensitive adhesive mainly composed of dimethylpolysiloxane may result in remarkable increase in peel force which is needed when the tape is peeled from its back surface or when the label is peeled from the support. Consequently, destruction of a pressure-sensitive adhesive layer and a release agent layer may occur when they are peeled, so that the tape or label may become of no use. In this respect, no satisfactory release properties can be attained even in the case of the above release agents disclosed in the Japanese Unexamined patent Publication (KOKAI) Nos. 225/581/1987 and 320//1988.

SUMMARY OF THE INVENTION

Accordingly, an object of this invention is to provide a curable silicone composition that can form a film having good release properties and durability thereof because of markedly small surface energy.

As such a composition, this invention provides a curable silicone composition, comprising:

(a) an organopolysiloxane having in its molecule at least two silicon-bonded $C_2$ to $C_8$ alkenyl groups and containing in its molecule at least one substituent selected from the group consisting of silicon-bonded fluorine-containing substituents represented by Formulas (1) to (4) in an amount of 3 mole % or more of all of the silicon-bonded organic groups in the molecule:

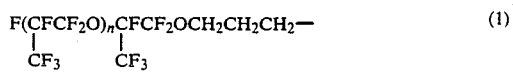
(1)

where n is an integer of 1 to 5,

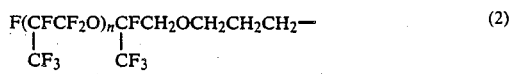
(2)

where n is an integer of 1 to 5,

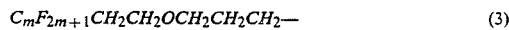
(3)

where m is an integer of 3 to 10, and

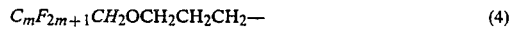
(4)

where m is an integer of 3 to 10;

(b) an organohydrogenpolysiloxane having in its molecule at least three silicon-bonded hydrogen atoms and containing in its molecule at least one substituent selected from the group consisting of silicon-bonded fluorine-containing substituents represented by said Formulas (1) to (4) and Formula (14):

(14)

where $R^5$ represents a $C_1$ to $C_8$ perfluoroalkyl group in an amount of 3 mole % or more of all of the silicon-bonded organic groups in the molecule; and (c) a catalyst for promoting the addition reaction between said silicon-bonded alkenyl groups and said silicon-bonded hydrogen atoms; the proportion of said silicon-bonded hydrogen atoms in Component (b) to said silicon-bonded alkenyl groups in Component (a) being at least 0.5.

The composition of this invention strongly adheres to various substrates such as papers, plastic films, metals and glass, and also sufficiently cure to form a film having a low surface energy. The film has good release properties, water repellency and oil repellency.

The resulting film shows peel force that is sufficiently small from the viewpoint of practical use, against pressure-sensitive adhesives having strong adhesion as exemplified by dimethylpolysiloxane based pressure-sensitive adhesives, which small peel force is stable with time. Moreover, there may occur no migration of silicone components to the pressure-sensitive adhesives, and hence the composition is useful as a good release agent for use in pressure-sensitive tapes or labels. The composition, as being capable of forming a film of low surface energy, is also useful as a release agent in other uses as exemplified by mold release agents for a variety of sorts of rubbers and plastics, graffiti-preventive, bills-preventive or anti-icing coating materials. The composition is also useful, for example, as a water repellent for use in fibers such as raincoats, tents and carpets: a waterproofing agent or water repellent for use in construction materials such as outer wall materials and bathroom wall materials: and a moistureproof coating material for printed boards, electronic parts or the like.

DESCRIPTION OF PRFERRED EMBODIMENTS OF THE INVENTION

In the Component (a) alkenyl group-containing organopolysiloxane used in the composition of this invention, the silicon-bonded alkenyl group may preferably be a vinyl group or an allyl group from the viewpoint of practical use, and at least two alkenyl groups are required to be contained in the molecule. This organopolysiloxane may preferably be straight-chain, and exemplified by an organopolysiloxane represented by the following Formula (5):

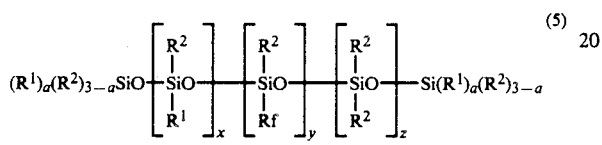

wherein $R^1$ may be the same or differnet and each represent a $C_2$ to $C_8$ alkenyl group such as a vinyl group and allyl group; and $R^2$ may be the same or different and each represent a $C_1$ to $C_8$ alkyl group such as a methyl group, an ethyl group, a propyl group and a butyl group, or a phenyl group. Rf represents at least one substituent selected from the group consisting of the fluorine-containing substituents represented by the above Formulas (1) to (4); a is an integer of from 1 to 3; and x, y and z are integers of $x \geq 0$, $y \geq 1$ and $z \geq 0$, respectively.

In Component (a), the fluorine-containing substituent is contained in an amount of 3 mol % or more of all of the silicon-bonded organic groups. The amount otherwise less than this may result in poor release properties.

Among the organopolysiloxanes of Formula (5) one of examples with high practical utility is a vinyl group-terminated organopolysiloxane represented by Formula (6):

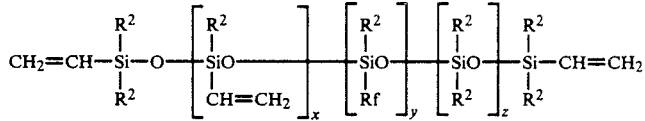

wherein $R^2$, Rf, x, y and z are as defined in the above Formula (5).

The organopolysiloxane represented by the above Formula (6) can be prepared, for example, by subjecting in an appropriate proportion depending on purposes, an organocyclotrisiloxane having the fluorine-containing substituent, represented by Formula (7):

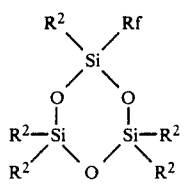

wherein $R^2$ and Rf are as defined in the above Formula (5), and a vinyl group-terminated organosiloxane represented by the formula (8):

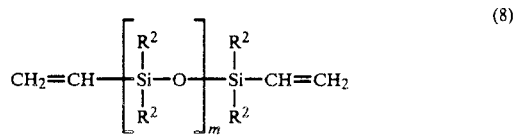

wherein $R^2$ is as defined in the above Formula (5), and m is an integer of 1 or more, optionally, together with an organocyclotrisiloxane represented by Formula (9):

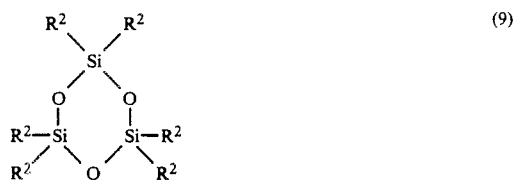

where $R^2$ is as defined in Formula (5) and/or an organocyclotrisiloxane represented by Formula (10)

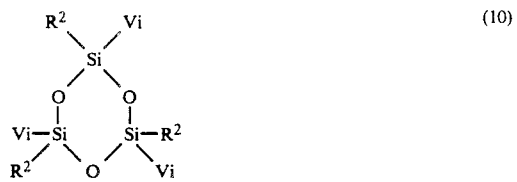

wherein $R^2$ is as defined in Formula (6) and Vi represents a vinyl group, to known equilibration in the presence of an acid or alkaline catalyst to effect polymerization.

The organocyclotrisiloxane having the fluorine-containing substituent of Formula (7) used in the preparation process exemplified above, can be synthesized, for example, by reacting a disiloxanediol represented by the formula (11):

wherein $R^2$ is as defined in the above Formula (5), and a dichlorosilane represented by Formula (12):

wherein $R^2$ and Rf are as defined in the above Formula (5), in the presence of an amine such as triethylamine, pyridine, dimethylaniline, diethylamine and urea as a catalyst. The catalyst may preferably be added in an amount of from 1 to 6 mol. particularly from 2 to 3 mol. per mol of the dichlorosilone compound. The reaction may preferably be carried out at a temperature of from 0 to 100° C., particularly from 30° to 0° C.

The above reaction can be carried out, for example, by separately preparing the respective solutions of the compounds of the above Formulas (11) and (12 ), and adding these in a solution containing the catalyst. Preferred as solvents for the disiloxanediol of Formula (11) are polar solvents such as methyl ethyl ketone, acetone and ethyl compound of Formula (12) are fluorinated hydrocarbon solvents such as m-xylene hexafluoride, perfluorooctane and 1.1.2-trichlorotrifluoroethane.

The Component (b) organohydrogenpolysiloxane needs to have a silicon-bonded fluorine-containing substituent selected from the above Formulas (1) to (4) and (14), as described above, in view of compatibility with said Component (a) and release properties obtained. Other substituents than the silicon-bonded fluorine-containing substituent are an alkyl group having 1 to 8 carbon atoms such as a methyl group, an ethyl group and a propyl group, or a phenyl group. The polysiloxanes of Component (b) are exemplified by polymers comprised of an $R^2HSiO$ unit, an $HSiO_{1.5}$ unit, an $(R^2)_2SiO$, an $R^2SiO_{1.5}$ unit, and $(R^2)_2HSiO_{0.5}$ unit, an $(R^2)_3SiO_{0.5}$ unit, an $R^2RfSiO$ unit and an $RfSiO_{1.5}$ unit, wherein $R^2$ is as defined in the above Formula (5), which may be any of linear, branched and cyclic ones.

From the viewpoint of practical use, Component (b) may preferably be a linear compound represented, for example, by the following Formula (13):

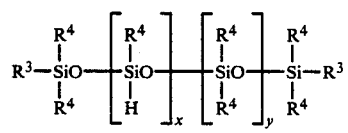
(13)

wherein $R^3$ may be the same or different and each represent a hydrogen atom, a $C_1$ to $C_8$ alkyl group or a phenyl group; $R^4$ may be the same or different and each are selected from the group consisting of a $C_1$ to $C_8$ alkyl group, a phenyl group, the fluorine-containing substituents represented by the above Formulas (1) to (4) and (14); x is an integer of 1 or more, and y is an integer of 0 or more, provided that x is a number that makes the number of the silicon-bonded hydrogen atoms in the molecule come to 3 or more, and part of $R^4$ comprises one or more of the fluorine-containing substituents of Formula (1) to (4) and (14), and particularly may preferably comprise any of the fluorine-containing substituents of Formulas (1) to (4).

The organohydrogenpolysiloxane of Formula (13) can also be prepared, for example, by a known method using equilibration of corresponding linear siloxanes and cyclic siloxanes. The fluorine-containing substituents of Formulas (1) to (4) can be introduced by using the organocyclotrisiloxane represented by the above Formula (7) The fluorine-containing substituent of Formula (14) can be introduced using corresponding organocyclotrisiloxane similar to Formula (7).

The Component (c) is a catalyst for promoting addition between Component (a) and Component (b). As Component (c), can be used the catalysts known as those for addition of silicon-bonded hydrogen atoms to silicon-bonded alkenyl groups. As such catalysts, well known are metals such as platinum, rhodium and iridium and compounds of these. Preferred catalysts are platinum catalysts as exemplified by chloroplatinic acid, complex salts of chloroplatinic acid with various sorts of olefins or vinylsiloxanes, platinum black, and platinums supported on all sorts of carriers.

Component (c) may be added in an amount that is commonly used in curable silicone compositions utilizing the addition reaction of this type, i.e., in an amount ranging from 1 to 1,000 ppm in terms of platinum based on total weight of Component (a) and Component (b).

Component (a) and Component (b) are used in amounts in the composition such that the number of the silicon-bonded hydrogen atoms in Component (b) may come to at least 0.5 per one silicon-bonded alkenyl group in Component (a). Preferably, the proportion of the silicon-bonded hydrogen atoms in Component (b) to the silicon-bonded alkenyl groups in Component (a) may be of from 0.5:1 to 10:1, more preferably from 1:1 to 5:1.

The composition of this invention can be obtained by mixing the above respective Components (a), (b) and (c) in given amounts, but, for the purpose of restraining the activity of the Component (c) catalyst, there may be optionally added retardants such as various sorts of organic nitrogen compounds, organic phosphorus compounds. acetylene compounds, oxime compounds and organic chlorinated compounds. The present composition may also be diluted according to use circumstances, with appropriate organic solvents such as chlorofluorocarbons, xylene hexafluoride, benzotrifluoride, perfluorooctane, and methyl ethyl ketone. The composition of this invention may further optionally contain dyes, pigments and reinforcing fillers.

The composition of this invention thus obtained may be applied by known techniques such as roll coating, spray coating and dipping, depending on substrates to be coated, coating amounts, etc.

After application on a substrate, the composition of this invention can be cured by known techniques such as room temperature curing, heat curing and ultraviolet curing, preferably by heat curing, for example, at 100° C. for 30 seconds or more, so that a film having a low surface energy can be formed.

EXAMPLES

This invention will be described below in greater detail by way of Examples and Comparative Examples

Synthesis Example 1

Synthesis of organocyclotrisiloxane having a fluorine-containing substituent

In four-necked flask having an internal volume of 2 lit., 600 ml of m-xylene hexafluoride was placed, and 53 g of triethylamine was dissolved therein. Fitted to this flask were two 500 ml dropping funnels, and placed in one of the dropping funnels was a solution of 115 g of dichlorosilane having a fluorine-containing group, represented by the formula:

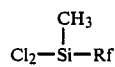

Where $R_f$ represents the group of

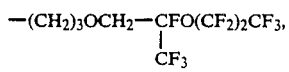

in 150 ml of m-xylene hexafluoride, and placed in the other dropping funnels was a solution of 44.8 g of disiloxanediol represented by the formula:

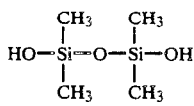

in 150 ml of methyl ethyl ketone. After the temperature of the triethylamine solution in the flask was raised to 50° C., the dichlorosilane solution and the disiloxanediol solution were dropwise added thereto from the two dropping funnels, respectively, at substantially the same dropping rate (about 1 ml/min) to carry out reaction. After completion of addition, the reaction mixture was stirred for 30 minutes. The resulting reaction product was washed with water to remove the by-product triethylamine hydrochloride, and then the organic layer thus obtained was separated and distilled under reduced pressure to yield 149.6 g of the compound, as a fraction of 126° C./16 mmHg, represented by the formula:

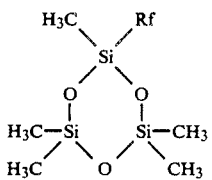

where Rf represents

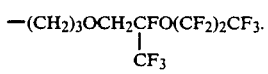

Synthesis example 2

Synthesis of vinyl group-containing organopolysiloxane (V-1)

The cyclotrisiloxane having a substituent obtained in Synthesis example 1 and 1,1,3,3-tetramethyl-1,3-divinyl-disiloxane were mixed in molar ratio of 120:1, and with stirring to 100 parts by weight of the resulting mixture was added 0.2 part by weight of $CF_3SO_3H$ to carry out reaction (equilibration) at room temperature for 10 hours. Thereafter,. 0.2 part by weight of 28 % $NH_3$ water was added, and the mixture was stirred at room temperature for 1 hour, followed by filtration of produced salt with a filter paper and then stripping at 150 C. under 5 mmHg for 1 hour to obtain vinyl group-containing organocyclosiloxane y-1 having the structure as shown in Table 2.

Synthesis Example 3

Syntheses of vinyl group-containing organopolysiloxanes (v-2 to y-i6)

The procedures of Synthesis Example 2 were repeated to synthesize vinyl group-containing organopolysiloxanes as shown in Table 1 and Table 2, except that organotrisiloxanes that correspond to the fluorine-containing substituents (Rf) of the desired organopolysiloxanes were synthesized in a similar way to Synthesis example 1 and used and also, according to &he desired molecular structures, one or more of cyclodimethyltrisiloxane, cyclomethylvinyltrisiloxane and cyclodiphenyltrisiloxane were used in the required proportion.

Synthesis Example 4

Synthesis of organohydrogenpolysiloxane (H-1)

Cyclotrisiloxane represented by the formula:

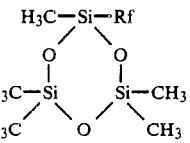

wherein Rf is

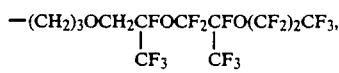

which was synthesized in a similar way to Synthesis example 1, methylhydrogencyclotetrasiloxane and hexamethyldisiloxane as a chain terminator were mixed in molar ratio of 50:6.25 : 1, and thereafter following the procedures in Synthesis Example 2, $CF_3SO_3H$ was added to carry out equilibration, followed by neutralization with aqueous ammonia, filtration, and then stripping to obtain organohydrogenpolysiloxane H-1 having the structure as shown in Table 3.

Synthesis Example 5

Syntheses of organohydrogenpolysiloxanes (H-2 to H-4 and H-6)

The procedures of Synthesis Example 3 were repeated to synthesize organohydrogenpolysiloxanes H-2 to H-4 and H-6 as shown in Table 3, except that cyclic oligomers were selected according to the desired molecular structures and 1,1,3,3 tetramethyl-1,3-dihydrosiloxane was used as a chain terminator as required.

Synthesis of organohydrocyclotrisiloxane (H-5)

Mixed were 4 mol of methylhydrogencyclotetrasiloxane and 1 mol of a compound of the formula:

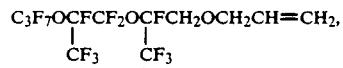

and added thereto was a platinum complex in an amount of 50 ppm in terms of platinum content based on the total weight to carry out reaction at 80° C. for 3 hours. The resulting reaction product was distilled under reduced pressure to obtain organohydrocyclotrisiloxane H-5 as a fraction of 107° C./S mmHg.

EXAMPLES 1 TO 17, COMPARATIVE EXAMPLES 1 TO 4

In each example, a vinyl group-containing polysiloxane (see Table 2) having a fluorine-containing substituent as shown in Table 1 and an organohydrogenpolysiloxane (see Table 2) were mixed so as to give a given ratio of SiH groups/SiCH=$CH_2$ groups (see Table 4). Five parts of the mixture thus obtained were diluted with 95 parts of Freon TF and 0.05 part of a complex salt of chloroplatinic acid with a vinylsiloxane (platinum concentration: 2%) was added to this mixture, thus preparing a treatment solution.

These Examples and Comparative Examples concern treatment solutions (compositions) having the following features, respectively.

EXAMPLES 1 TO 4:

Examples in which the fluorine-containing substituent in vinyl group-containing siloxane was varied.

EXAMPLES 8 AND 9:

Examples in which the polymerization degree of vinyl group-containing siloxane was varied.

EXAMPLE 10:

An example using a vinyl group-containing siloxane having a vinyl group on side chains.

EXAMPLE 11:

An example using a vinyl group-containing siloxane containing a phenyl group.

EXAMPLE 12:

An example in which the modification by the fluorine-containing substituent is effected with a low rate.

EXAMPLES 13 AND 14:

Examples in which the fluorine-containing substituent in organohydrogenpolysiloxane was varied.

EXAMPLE 15:

An example using a cyclic organohydrogenpolysiloxane

EXAMPLES 16 AND 17:

Examples in which the ratio of SiH groups/-SiCH=CH=CH$_2$ groups is different.

COMPARATIVE EXAMPLES 1 TO 3:

Examples in which a $C_nF\ CH_{2n+1}CH_2CH_2$- group is contained as its fluorine-containing substituent.

COMPARATIVE EXAMPLE 4:

An example in which the ratio of SiH groups/-SiCH=CH$_2$ groups is considerably small.

COMPARATIVE EXAMPLE 5:

An example in which no fluorine-containing substituent is contained.

Next, these treatment solutions each were coated on polyethylene-laminated paper according to the method shown below to form a cured film. On the resulting respective films, measurement of peel force and adhesion to supports after aging at 25° C. and 70° C. were made according to the evaluation methods shown below. Results obtained are shown in Table 4.

(1) Coating method

The composition is diluted with Freon TF (available from Mitsui Du Pont Fluorochemical Co.) to give a concentration of 5 %, and coated on polyethylene-laminated paper by using a bar coater No. 14. The paper coated with the composition is heated at 150° C. for 60 seconds by use of a hot-air circulation dryer to form a cured film.

(2) Evaluation methods

1. Aging

A dimethylpolysiloxane based pressure-sensitive adhesive tape, Nitofron No. 903 UL (available from Nitto Denki Kogyo K.K.; 19 mm wide), is stuck on the surface of the cured film, and aging is effected under a load of 20 g/cm$^2$ at 25° C. or 70° C. respectively for 24 hours.

2. Measurement of peel force

After the aging at 25° C. or 70° C., the stuck paper is pulled using a tensile tester at angle of 180° at a peel rate of 30 cm/min to measure the force (g) required for peeling.

3. Measurement of adhesion

A pressure-sensitive tape peeled from the surface of the cured film is stuck to a stainless steel sheet, and then this tape is pulled at an angle of 180° with the adhesive tape at a rate of 30 cm/min to measure the force (g) required for peeling.

For comparison, as a blank, the above pressure-sensitive tape is stuck on a Teflon sheet to make measurement of peel force and adhesion in the same manner as above.

As will be clear from Table 4, all of Examples 1 to 17 showed peel force that is sufficiently low from the viewpoint of practical use, and also showed the same level of adhesion as in the blank (the example of Teflon sheet). These tell that there is no transfer to the adhesive. It is seen, on the other hand, that no cured film is obtained in Comparative Example 4 and that, in Comparative Examples 1, 2, 3 and 5, the peel force of cured films is so large that they can be of no practical use.

TABLE 1

| Symbol | Fluorine-containing substituent Structure |
|---|---|
| A | $CF_3(CF_2)_2OCFCH_2OCH_2CH_2CH_2-$<br>$\quad\quad\quad\quad\quad\; \mid$<br>$\quad\quad\quad\quad\quad CF_3$ |
| B | $CF_3(CF_2)_2OCFCF_2OCFCH_2OCH_2CH_2CH_2-$<br>$\quad\quad\quad\quad\quad\; \mid \quad\quad\;\; \mid$<br>$\quad\quad\quad\quad\quad CF_3 \quad\; CF_3$ |
| C | $CF_3(CF_2)_2O(CFCF_2O)_2CFCH_2OCH_2CH_2CH_2-$<br>$\quad\quad\quad\quad\quad\quad\; \mid \quad\quad\quad\; \mid$<br>$\quad\quad\quad\quad\quad\quad CF_3 \quad\quad CF_3$ |
| D | $CF_3(CF_2)_2OCFCF_2OCFCF_2OCH_2CH_2CH_2-$<br>$\quad\quad\quad\quad\quad\; \mid \quad\quad\;\; \mid$<br>$\quad\quad\quad\quad\quad CF_3 \quad\; CF_3$ |
| E | $CF_3(CF_2)_3CH_2CH_2OCH_2CH_2CH_2-$ |
| F | $CF_3(CF_2)_5CH_2CH_2OCH_2CH_2CH_2-$ |
| G | $CF_3(CF_2)_7CH_2CH_2OCH_2CH_2CH_2-$ |
| H | $CF_3(CF_2)_3CH_2CH_2-$ |
| I | $CF_3CH_2CH_2-$ |

TABLE 2

Vinyl group-containing polysiloxane $$CH_2=CH-\underset{\underset{CH_3}{|}}{\overset{\overset{CH_3}{|}}{Si}}O\underset{}{(}\underset{\underset{CH_3}{|}}{\overset{\overset{CH_3}{|}}{Si}}O)_w(\underset{\underset{CH=CH}{|}}{\overset{\overset{CH_3}{|}}{Si}}O)_x(\underset{\underset{C_6H_6}{|}}{\overset{\overset{C_6H_6}{|}}{Si}}O)_y(\underset{\underset{Rf}{|}}{\overset{\overset{CH_3}{|}}{Si}}O)_z\underset{\underset{CH_3}{|}}{\overset{\overset{CH_3}{|}}{Si}}-CH=CH_2$$

wherein Rf, w, x, y and z are as follows:

| No. | Rf group | w | x | y | z |
|---|---|---|---|---|---|
| V-1 | A | 0 | 240 | 0 | 120 |
| V-2 | B | " | " | " | " |
| V-3 | C | " | " | " | " |
| V-4 | D | " | " | " | " |
| V-5 | E | " | " | " | " |
| V-6 | F | " | " | " | " |
| V-7 | G | " | " | " | " |
| V-8 | H | " | " | " | " |
| V-9 | I | " | " | " | " |
| V-10 | " | " | 0 | " | 360 |

TABLE 2-continued

Vinyl group-containing polysiloxane

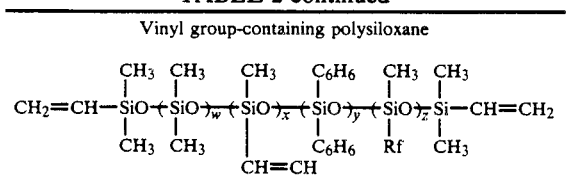

wherein Rf, w, x, y and z are as follows:

| No. | Rf group | w | x | y | z |
|---|---|---|---|---|---|
| V-11 | B | " | 40 | " | 20 |
| V-12 | " | " | 660 | " | 340 |
| V-13 | " | 2 | 238 | " | 120 |
| V-14 | " | 0 | 200 | 40 | 60 |
| V-15 | C | " | 324 | 0 | 36 |
| V-16 | — | " | 300 | 0 | 0 |

TABLE 3

| No. | Rf group | Organohydrogenpolysiloxane Structure |
|---|---|---|
| H-1 | B | $(CH_3)_3SiO\!\!-\!\!(SiO)_{25}\!\!-\!\!(SiO)_{25}\!\!-\!\!(SiO)_{50}\!\!-\!\!Si(CH_3)_3$ with H, Rf, CH₃ substituents |
| H-2 | G | " |
| H-3 | I | " |
| H-4 | B | $H\!\!-\!\!SiO\!\!-\!\!(SiO)_{25}\!\!-\!\!(SiO)_{25}\!\!-\!\!(SiO)_{50}\!\!-\!\!Si\!\!-\!\!H$ with CH₃, H, Rf, CH₃, CH₃ substituents |

TABLE 3-continued

| No. | Rf group | Organohydrogenpolysiloxane Structure |
|---|---|---|
| H-5 | B | $-(SiO)_5\!\!-\!\!SiO-$ with CH₃, CH₃, H, Rf |
| H-6 | — | $(CH_3)_3SiO\!\!-\!\!(SiO)_{38}\!\!-\!\!Si(CH_3)_3$ with CH₃, H |

TABLE 4

| | Composition of treatment solution | | | Characteristics | | | |
|---|---|---|---|---|---|---|---|
| | Vinyl-organo-polysiloxane | Organo-hydrogen-polysiloxane | H/Vi ratio | 25° C. | | 70° C. | |
| | | | | Peel force | Adhesion | Peel force | Adhesion |
| Example | | | | | | | |
| 1 | V-1 | H-1 | 2.0 | 4 | 610 | 10 | 595 |
| 2 | V-2 | " | " | 3 | 608 | 6 | 612 |
| 3 | V-3 | " | " | 3 | 620 | 4 | 603 |
| 4 | V-4 | " | " | 3 | 595 | 6 | 605 |
| 5 | V-5 | " | " | 8 | 605 | 21 | 598 |
| 6 | V-6 | " | " | 7 | 612 | 18 | 603 |
| 7 | V-7 | " | " | 7 | 592 | 15 | 615 |
| 8 | V-11 | " | " | 4 | 605 | 8 | 608 |
| 9 | V-12 | " | " | 3 | 608 | 7 | 595 |
| 10 | V-13 | " | " | 3 | 598 | 7 | 605 |
| 11 | V-14 | " | " | 15 | 603 | 32 | 608 |
| 12 | V-15 | " | " | 7 | 615 | 14 | 607 |
| 13 | V-2 | H-2 | " | 3 | 610 | 6 | 613 |
| 14 | " | H-4 | " | 3 | 602 | 7 | 597 |
| 15 | " | H-5 | " | 9 | 598 | 12 | 602 |
| 16 | " | H-1 | 1.0 | 3 | 590 | 6 | 585 |
| 17 | " | " | 1.5 | 3 | 603 | 5 | 610 |
| Comparative Example | | | | | | | |
| 1 | V-8 | H-3 | 2.0 | 173 | 603 | 298 | 598 |
| 2 | V-9 | " | " | 325 | 620 | 410 | 612 |
| 3 | V-10 | " | " | 390 | 612 | 450 | 608 |
| 4 | V-1 | H-1 | 0.4 | uncured | | | |
| 5 | V-16 | H-6 | 2.0 | 440 | 621 | 1050 | 611 |
| Blank | Teflon sheet | | | 345 | 618 | 400 | 610 |

Unit: g/19 mm

We claim:

1. A curable silicone composition, comprising:
(a) an organopolysiloxane having in its molecule at least two silicon-bonded $C_2$ to $C_8$ alkenyl groups and containing in its molecule at least one substituent selected from the group consisting of silicon-bonded fluorine-containing substituents represented by Formulas (1) to (4) in an amount of 3 mole % or more of all of the silicon-bonded organic groups in the molecule:

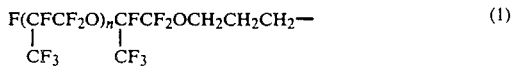

$$F(CFCF_2O)_n CFCF_2 OCH_2 CH_2 CH_2 - \quad (1)$$
with $CF_3$, $CF_3$ substituents where n is an integer of 1 to 5,

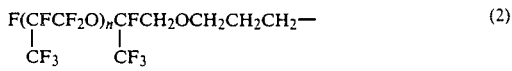

$$F(CFCF_2O)_n CFCH_2 OCH_2 CH_2 CH_2 - \quad (2)$$
with $CF_3$, $CF_3$ substituents where n is an integer of 1 to 5, $$C_mF_{2m+1}CH_2CH_2OCH_2CH_2CH_2— \quad (3)$$

where m is an integer of 3 to 10, and $$C_mF_{2m+1}CH_2OCH_2CH_2CH_2— \quad (4)$$

where m is an integer of 3 to 10;
(b) an organohydrogenpolysiloxane having in its molecule at least three silicon-bonded hydrogen atoms and containing in its molecule at least one substituent selected from the group consisting of silicon-bonded fluorine-containing substituents represented by said Formulas (1) to (4) and Formula (14):

$$R^5CH_2CH_2— \quad (14)$$

where $R^5$ represents a $C_1$ to $C_8$ perfluoroalkyl group in an amount of 3 mole % or more of all of the silicon-bonded organic groups in the molecule; and (c) a catalyst for promoting the addition reaction between said silicon-bonded alkenyl groups and said silicon-bonded hydrogen atoms; the proportion of said silicon-bonded hydrogen atoms in Component (b) to said silicon-bonded alkenyl groups in Component (a) being at least 0.5.

2. The composition according to claim 1, wherein said Component (a) is represented by Formula (5):

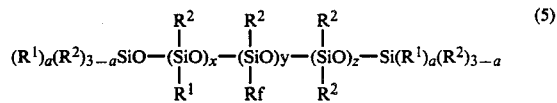

wherein $R^1$ represents a $C_2$ to $C_8$ alkenyl group; $R^2$ may be the same or different and represents a $C_1$ to $C_8$ alkyl group or a phenyl group; Rf represents at least one selected from the fluorine-containing substituents represented by the above Formulas (1) to (4); a is an integer of from 1 to 3; and x, y and z are integers of $x \geq 0$, $Y \geq 1$ and $z \geq 0$, respectively.

3. The composition according to claim 2, wherein said component (a) is represented by Formula (6):

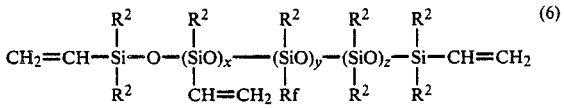

wherein $R^2$, Rf, x, y and z are as defined in Formula (5).

4. The composition according to claim 1, wherein said Component (b) is represented by Formula (13):

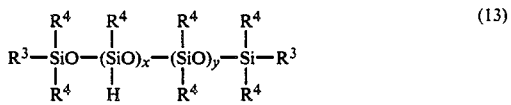

wherein $R^3$ may be the same or different and represent a hydrogen atom, a $C_1$ to $C_8$ alkyl group or a phenyl group; $R^4$ may be the same or different and represent a $C_1$ to $C_8$ alkyl group, a phenyl group, or at least one substituent selected from the group consisting of the fluorine-containing containing substituents of the above Formulas (1) to (4) and said Formula (14); and x is an integer of 1 or more, and y is an integer of 0 or more, provided that x is a number that makes the number of the silicon-bonded hydrogen atoms come to 3 or more.

5. The composition according to claim 1, wherein the proportion of said silicon-bonded hydrogen atoms in Component (b) to said silicon-bonded alkenyl groups in Component (a) is 0.5:1 to 10:1.

6. The composition according to claim 1, wherein said Component (c) is a platinum catalyst.

7. The composition according to claim 6, wherein the amount of said catalyst of the component (c) ranges from 1 to 1,000 ppm in terms of platinum based on the total weight of Component (a) and Component (b).

* * * * *